United States Patent
Wier

(10) Patent No.: US 6,179,330 B1
(45) Date of Patent: Jan. 30, 2001

(54) VEHICLE OCCUPANT RESTRAINT SYSTEM

(75) Inventor: Franz Wier, Göggingen (DE)

(73) Assignee: TRW Occupant Restraint Systems GmbH, Alfdorf (DE)

(*) Notice: Under 35 U.S.C. 154(b), the term of this patent shall be extended for 0 days.

(21) Appl. No.: 09/016,843

(22) Filed: Jan. 30, 1998

(30) Foreign Application Priority Data

Feb. 7, 1997 (DD) .......................................... 297 02 125 U

(51) Int. Cl.[7] .......................... B60R 22/46; B60R 22/34; B60R 22/00; B60R 21/00
(52) U.S. Cl. ......................... 280/806; 280/807; 280/808; 180/268
(58) Field of Search ................. 280/801.1, 806, 280/807, 808; 180/268

(56) References Cited

U.S. PATENT DOCUMENTS

| | | | |
|---|---|---|---|
| 4,079,964 | * 3/1978 | Yamada et al. | 280/807 |
| 4,087,118 | * 5/1978 | Shimogawa et al. | 280/807 |
| 4,222,586 | * 9/1980 | Takada | 280/803 |
| 4,583,762 | * 4/1986 | Carlstedt | 280/801.1 |
| 4,621,835 | * 11/1986 | Edwards | 280/803 |
| 5,492,368 | 2/1996 | Pywell et al. | |
| 5,519,997 | * 5/1996 | Specht | 60/632 |
| 5,547,143 | * 8/1996 | Miller, III et al. | 242/379.1 |
| 5,566,978 | 10/1996 | Fleming et al. | |
| 5,588,677 | * 12/1996 | Kopetzky et al. | 280/806 |
| 5,615,917 | * 4/1997 | Bauer | 280/806 |
| 5,634,664 | * 6/1997 | Seki et al. | 280/806 |
| 5,944,350 | * 8/1999 | Grabowski et al. | 280/806 |
| 5,967,440 | * 10/1999 | Marshall | 242/374 |
| 5,971,488 | * 10/1999 | Pedronno et al. | 297/468 |
| 5,984,357 | * 11/1999 | Yasuda et al. | 280/806 |
| 5,988,680 | * 11/1999 | Wier | 280/806 |
| 6,036,274 | * 3/2000 | Kohindorfer et al. | 297/480 |

FOREIGN PATENT DOCUMENTS

3343325 * 6/1985 (DE) .

* cited by examiner

Primary Examiner—Brian L. Johnson
Assistant Examiner—Matthew Luby
(74) Attorney, Agent, or Firm—Tarolli, Sundheim, Covell, Tummino & Szabo L.L.P.

(57) ABSTRACT

A vehicle occupant restraint system includes a belt web, a belt retractor, a belt buckle, an insertion tongue, two belt tensioners, one of which is a retractor tensioner and the other a buckle tensioner, as well as at least one control unit coupled to the belt tensioners, this control unit activating the belt tensioners in a restraint situation. Instead of the buckle tensioner a end fitting tensioner can be provided.

12 Claims, 2 Drawing Sheets

VEHICLE OCCUPANT RESTRAINT SYSTEM

TECHNICAL FIELD

The invention relates to a vehicle occupant restraint system.

BACKGROUND OF THE INVENTION

Vehicle occupant restraint systems which comprise a seat belt are often provided even in compact cars with a belt tensioner which tensions the seat belt in a restraint situation so that the belt is in snug contact with the body of the vehicle occupant. Belt tensioners hitherto conventional are available as retractor tensioners, buckle tensioners or end fitting tensioners secured to differing locations in the vehicle and introducing the force exerted by them correspondingly into differing locations in the belt system.

BRIEF SUMMARY OF THE INVENTION

The invention defines a vehicle occupant restraint system, the restraining effect of which is significantly better than that of hitherto conventional restraint systems.

According to a first aspect, the vehicle occupant restraint system according to the invention comprises a belt web, a belt retractor, a belt buckle, an insertion tongue, two belt tensioners, one of which is a retractor tensioner and the other a buckle tensioner, as well as at least one control unit coupled to the belt tensioners, this control unit activating the belt tensioners in a restraint situation.

According to a second aspect, the vehicle occupant restraint system comprises a belt web, a belt retractor, a belt buckle, an insertion tongue, two belt tensioners, one of which is a retractor tensioner and the other an end fitting tensioner, as well as at least one control unit coupled to said belt tensioners, said control unit activating at least one of said belt tensioners in a restraint situation.

Contrary to those known hitherto, the vehicle occupant restraint system in accordance with the invention operates with two belt tensioners acting on a single belt web, one of which is mainly responsible for tensioning the shoulder belt component and the other mainly for tensioning the pelvis belt component. Friction losses in the case of a retractor tensioner due to deflection of the belt web at the deflection fitting in the region of the B-pillar and friction losses at the insertion tongue are mostly avoided in the case of the vehicle occupant restraint system in accordance with the invention. Each of the two belt tensioners provided may be configured more compact than as usual for a belt tensioner so that advantages materialize for accommodating the belt tensioners in the vehicle. Furthermore, due to several belt tensioners being provided, the time needed for the tensioning action is reduced. More particularly, retractor tensioners suffered the disadvantage that the pelvis belt component was often inadequately tensioned due to the long force travel up to it and due to the elasticity of the belt web. As a result of a tensioning force also being introduced separately into the pelvis belt component directly, belt slack occuring in this region after the tensioning action is avoided and twisting of the lower trunk as well the vehicle occupant slipping under the pelvis belt component are prevented.

In accordance with the preferred embodiment at least one of the two belt tensioners comprises a force limiter so that also the maximum force exterted on the occupant during the restraint action is limited. Preferably at least one of the retractor tensioners is provided with a force limiter to reduce the so-called HIC values in the region of the upper trunk and head of the occupant.

To further reduce the maximum acceleration values occurring it may be of advantage when the control unit activates the two belt tensioners in a restraint action staggered in time, depending on the seat or vehicle structure.

The control unit may be coupled to sensors which detect the constitution of the occupant, i.e. for instance his/her weight or stature, the seating position of the occupants or the ambient conditions such as temperature inside and outside of the vehicle. Depending on one or more of these factors one of the two belt tensioners or both belt tensioners are activated. When a pyrotechnic multistage belt tensioner is provided the tensioning force may in addition be adapted to the restraint situation by ignition of one or more stages.

DETAILED DESCRIPTION OF PREFERRED EMBODIMENTS

Figure 1:
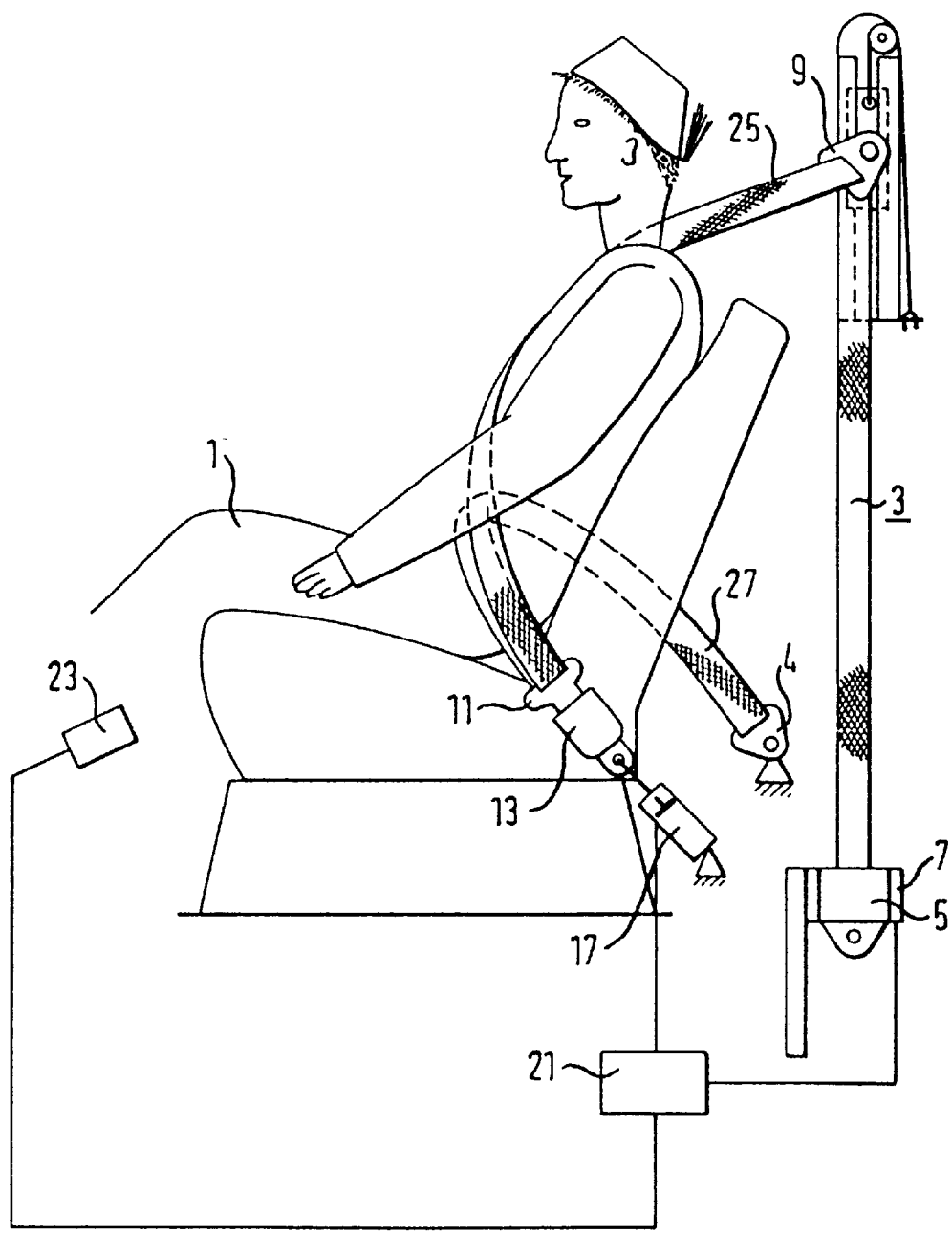
FIG. 1 shows a first embodiment of the vehicle occupant restraint system in accordance with the invention incorporating a retractor tensioner and a buckle tensioner.

In FIG. 1 a vehicle occupant 1 is shown requiring to be prevented from being displaced forwards relative to the vehicle in a restraint situation by the vehicle occupant restraint system also depicted. The vehicle occupant restraint system comprises a belt web 3 which is secured to the vehicle at one end via an end fitting 4 and at the other end via a belt retractor 5. The belt retractor 5 is provided with a retractor tensioner 7. From the belt retractor 5 the belt web 3 runs vertically upwards up to a height-adjustable deflection fitting 9 and from there inclined via the upper trunk of the occupant up to an insertion tongue 11 which can be locked in a belt buckle 13. The belt web 3 extends through a hoop section in the insertion tongue 11 in front of the pelvis of the vehicle occupant 1 up to the vehicle-fixed end fitting 4.

The belt buckle 13 is coupled to a buckle tensioner 17 which, like the impact tensioner 7, is configured as a multistage belt tensioner by it comprising several pyrotechnic gas generants. The propellant charges of the buckle tensioner 17, like the pyrotechnic propellant charges of the retractor tensioner 7, can be ignited individually or together at the same time in a restraint action. In addition to this, the control unit 21 is connected to several sensors of which only one sensor 23 is shown. These sensors 23 detect not only the seat position of the vehicle occupant but also his/her bodily constitution such as stature and weight, i.e. factors effecting the calculation of a restraint force defined optimized for the vehicle occupant concerned. In addition, vehicle-sensitive sensors, for instance crash sensors, are provided which determine the impact intensity. Via temperature sensors the temperature inside and outside of the vehicle is sensed, thus enabling the system to draw conclusion with high probability regarding the clothes the vehicle occupant is wearing. At low temperatures, for instance, it can be assumed that the vehicle occupant is wearing heavier clothing so that a greater tensioning path would be of advantage.

Depending on the above factors in a restraint situation activation of the belt tensioners is initiated in the control unit 21 whereby, for instance, in a less serious accident only one stage, i.e. only one propellant charge is ignited.

In addition, the retractor tensioner 7 and the buckle tensioner 17 are not activated simultaneously but staggered in time, this having the advantage that the vehicle occupant 1 is not exposed to excessively high forces due to belt tensioning.

The retractor tensioner 7 provides more particularly for a tensioning of a shoulder belt component 25 extending between the deflection fitting 9 and that of the insertion tongue 11, whereas the buckle tensioner 17 acts to the same degree on the shoulder belt component 25 and the pelvis belt component 27 extending between the end fitting 4 and the insertion tongue 11.

Figure 2:
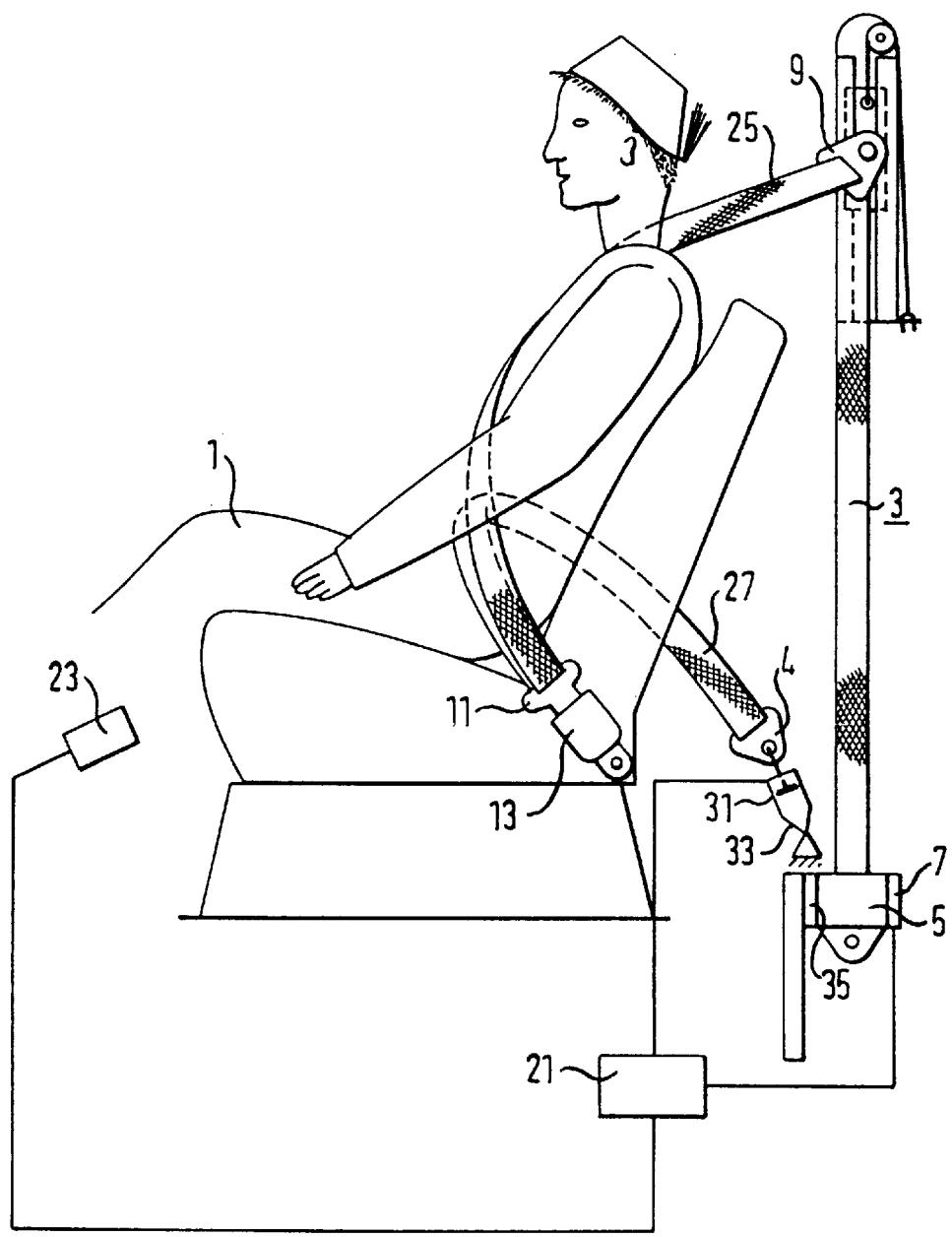
FIG. 2 shows a second embodiment of the vehicle occupant restraint system in accordance with the invention incorporating a retractor tensioner and an end fitting tensioner.

The embodiment shown in FIG. 2 corresponds substantially to that shown in FIG. 1 so that like parts are also identified by like reference numerals and no details being provided to these parts in the following. Instead of being provided with a buckle tensioner the embodiment of the vehicle occupant restraint system shown in FIG. 2 is equipped with an end fitting tensioner 31 in which a force limiter 33 is integrated as is indicated by the conically tapered inner side of a tensioner tube. The retractor tensioner 5 comprises likewise an integrated force limiter 35. Due to the force limiters 33, 35 the force exerted on the vehicle occupant 1 in a restraint action can be restricted. In the case of the embodiment shown in FIG. 2, the retractor tensioner 5 provides mainly for a tensioning of the shoulder belt component 25, whereas the end fitting tensioner 31 provides for a tensioning of the pelvis belt component 27.

More particularly should the pelvis belt component 27 not be tightened closely enough to the body of the occupant 1, twisting in the pelvis region of the occupant may result in a restraint situation during a scewed impact of the vehicle. This can be avoided by the vehicle occupant restraint system as shown in FIGS. 1 and 2 with two belt tensioners.

If the seat position or seat and vehicle structure is such that slipping of the occupant under the pelvis belt component 27, i.e. submarining, may easily happen, then preferably first the buckle tensioner 17 or the end fitting tensioner 31 is activated.

Should the vehicle occupant be leaning forward at the time of vehicle impact, then it is appropriate that first the retractor tensioner 5 is activated to stabilize as far as possible the upper trunk of the occupant 1 by the shoulder belt component 25 then being in close contact.

What is claimed is:

1. A vehicle occupant restraint system, comprising a belt web, a belt retractor, a belt buckle, an insertion tongue, two belt tensioners, one of which is a retractor tensioner and the other a buckle tensioner, at least one control unit coupled to said belt tensioners, and temperature sensors which sense the temperature inside and outside of the vehicle, said control unit being coupled to said sensors and activating at least one of said belt tensioners in a restraint situation depending on the values sensed.

2. A vehicle occupant restraint system, comprising a belt web, a belt retractor, a belt buckle, an insertion tongue, two belt tensioners, one of which is a retractor tensioner and the other an end fitting tensioner, at least one control unit coupled to said belt tensioners, and temperature sensors which sense the temperature inside and outside of the vehicle, said control unit being coupled to said sensors and activating at least one of said belt tensioners in a restraint situation depending on the values sensed.

3. A vehicle occupant restraint system, comprising a belt web, a belt retractor, a belt buckle, an insertion tongue, two belt tensioners, one of which is a retractor tensioner and the other a buckle tensioner, as well as at least one control unit coupled to said belt tensioners, wherein said control unit is coupled to at least one of sensors detecting a bodily constitution of a vehicle occupant, sensors detecting a seat position of a vehicle occupant, vehicle-sensitive sensors and temperature sensors which sense the temperature inside and outside of the vehicle, said control unit activating either one or both of said belt tensioners depending on the values sensed in a restraint situation.

4. The vehicle occupant restraint system as set forth in claim 3, wherein at least one of said two belt tensioners comprises a force limiter.

5. The vehicle occupant restraint system as set forth in claim 3, wherein said control unit activates said belt tensioners staggered in time in a restraint situation.

6. The vehicle occupant restraint system as set forth in claim 5, wherein said control unit determines which one of said two belt tensioners is to be ignited first, depending on the values sensed.

7. The vehicle occupant restraint system as set forth in claim 5, wherein at least one of said belt tensioners is configured as a multistage pyrotechnic belt tensioner, the stages of which can be activated independently of each other.

8. A vehicle occupant restraint system, comprising a belt web, a belt retractor, a belt buckle, an insertion tongue, two belt tensioners, one of which is a retractor tensioner and the other an end fitting tensioner, as well as at least one control unit coupled to said belt tensioners, wherein said control unit is coupled to at least one of sensors detecting a bodily constitution of a vehicle occupant, sensors detecting a seat position of a vehicle occupant, vehicle-sensitive sensors, and temperature sensors which sense the temperature inside and outside of the vehicle, said control unit activating either one or both of said belt tensioners depending on the values sensed in a restraint situation.

9. The vehicle occupant restraint system as set forth in claim 8, wherein at least one of said two belt tensioners comprises a force limiter.

10. The vehicle occupant restraint system as set forth in claim 8, wherein said control unit activates said belt tensioners staggered in time in a restraint situation.

11. The vehicle occupant restraint system as set forth in claim 10, wherein said control unit determines which one of said two belt tensioners is to be ignited first, depending on the values sensed.

12. The vehicle occupant restraint system as set forth in claim 8, wherein at least one of said belt tensioners is configured as a multistage pyrotechnic belt tensioner, the stages of which can be activated independently of each other.

\* \* \* \* \*

UNITED STATES PATENT AND TRADEMARK OFFICE
CERTIFICATE OF CORRECTION

PATENT NO. : 6,179,330 B1
DATED : January 30, 2001
INVENTOR(S) : Franz Wier

It is certified that error appears in the above-identified patent and that said Letters Patent is hereby corrected as shown below:

<u>Column 4,</u>
Line 28, change "5" to -- 3 --.

Signed and Sealed this

Fourteenth Day of May, 2002

Attest:

JAMES E. ROGAN
Attesting Officer    *Director of the United States Patent and Trademark Office*